UNITED STATES PATENT OFFICE.

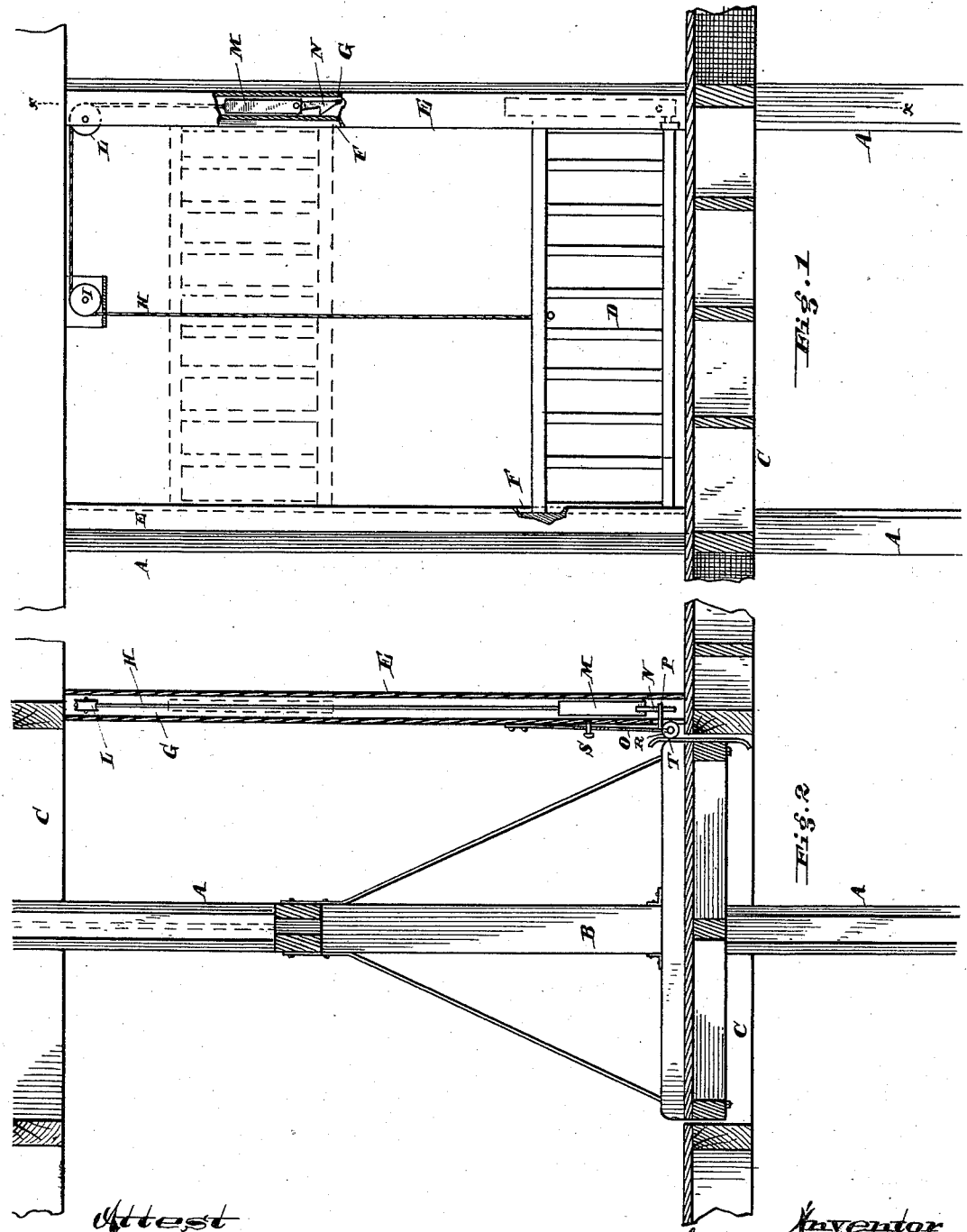

WILLIAM STEVENS, OF PHILADELPHIA, PENNSYLVANIA.

ELEVATOR.

SPECIFICATION forming part of Letters Patent No. 305,543, dated September 23, 1884.

Application filed May 24, 1884. (No model.)

*To all whom it may concern:*

Be it known that I, WILLIAM STEVENS, of the city and county of Philadelphia, and State of Pennsylvania, have made new and useful Improvements in Elevators, of which the following is a specification.

My invention has reference to automatically-closing gates for elevator-hatchways; and it consists in certain improvements by which the gate, when raised, automatically closes itself if the platform or cage is not at the hatchway the entrance to which the gate is arranged to close, but remains up when raised if the cage is at the hatchway, and automatically closes when the cage is raised or lowered, all of which are fully set forth in the following specification, and shown in the accompanying drawings, which form part thereof.

In the drawings, Figure 1 is a front elevation of the elevator and hatchway, showing the gate closed; and Fig. 2 is a sectional elevation of same on line $xx$, showing the various parts in the positions assumed when the gate is raised and cage at the hatchway.

A are the elevator or cage guide-posts.

B is the platform or cage.

C is the hatchway.

D is the gate, which is arranged to slide vertically in guideways F in posts E. One of these posts is hollow, as shown at G, and in which a weight, M, slides, the said weight being connected with the gate by a rope, H, which passes over sheaves L and I, the latter being arranged over the center of the gate and supported in a frame, J, having a guiding-hole, K, for the rope H, to prevent its leaving the said sheave I. The weight M almost counterbalances the gate D, so that it requires but little exertion to raise said gate, and when left to itself it closes gently.

O is a spring secured to the post E, and kept in position and having its throw limited by a pin or stud, S, passing through a slot in said spring. To the bottom of said spring is journaled a roller, R, which is adapted to reduce friction when the cam-face T, secured to the floor of the cage B, strikes it to press in the spring O. Secured to the lower end of said spring is a locking-pin, P, which, when the gate is raised and the weight M lowered, catches the pawl N on said weight and prevents its being raised until the pin P is withdrawn.

Instead of the spring O, a hinged arm might be used, and a weight or coil spring used to make it spring back when unacted on by cam T.

The operation is as follows: The gate being closed and the elevator-cage down, it is evident that if the gate were raised it would always close down slowly if left to itself. If the cage be raised to a level with the hatchway, then upon raising the gate the pawl N of the weight M will be caught upon the pin P and the gate retained in its elevated position. Now, as the cage is raised or lowered to the extent of, say, one foot, the roller R runs off the cam T, and the spring O withdraws the pin P, unlocking the weight, and the gate automatically descends.

My improved mechanism is constructed in a compact manner, and, being simple, is not liable to derangement or breakage, and is sure in its action.

Having now described my invention, what I claim as new, and desire to secure by Letters Patent, is—

1. The combination of cage B, having cam T, hatchway C, gate D, guides F, rope H, supporting and guiding sheaves, weight M, having catch N, spring O, having roller R, and pin P, substantially as and for the purpose specified.

2. The combination of cage B, having cam T, hatchway C, gate D, guides F, rope H, supporting and guiding sheaves, weight M, having catch N, spring O, having roller R, and pin P, and limiting-stud S, to limit the movement of spring O, substantially as and for the purpose specified.

In testimony of which invention I hereunto set my hand.

WILLIAM STEVENS.

Witnesses:
R. M. HUNTER,
GEORGE E. HAMMEL.